United States Patent [19]

Ikeda

[11] Patent Number: 4,509,927
[45] Date of Patent: Apr. 9, 1985

[54] BOTTOM EXHAUST HIGH SPEED BOAT

[76] Inventor: Akira Ikeda, 22-6, 4-Chome, Sonan, Sagamihara-shi, Kanagawa-ken, Japan

[21] Appl. No.: 473,749

[22] Filed: Mar. 9, 1983

[30] Foreign Application Priority Data

Mar. 9, 1982 [JP] Japan .................. 57-35747

[51] Int. Cl.³ .............................................. B63B 1/34
[52] U.S. Cl. ....................................... 440/89; 440/88; 114/67 A; 114/62; 114/291; 114/288
[58] Field of Search ................. 440/89, 88; 114/67 A, 114/62, 288, 289, 290, 291

[56] References Cited

U.S. PATENT DOCUMENTS

| 1,003,364 | 9/1911 | Langston | 114/67 A |
| 1,069,945 | 8/1913 | Hall | 440/89 |
| 1,737,180 | 11/1929 | Willis | 440/89 |
| 1,766,360 | 6/1930 | Schipper | 114/62 |
| 2,450,665 | 10/1948 | Jutte | 440/89 |
| 4,165,703 | 8/1979 | Burg | 114/67 A |

FOREIGN PATENT DOCUMENTS 86891 7/1981 Japan .................. 440/89

Primary Examiner—Trygve M. Blix
Assistant Examiner—Patrick W. Young
Attorney, Agent, or Firm—Oblon, Fisher, Spivak, McClelland & Maier

[57] ABSTRACT

A bottom exhaust type high speed boat has a hull including a grooved bottom. The engine exhaust pipe extends into a midportion of the grooved bottom. A duct fixed to the surface of the hull extends between the opening of the exhaust pipe and the front of the grooved bottom for transporting exhaust gases to the front of the grooved bottom. The grooved bottom is separated into a forward part and a rearward part, having different depths, by a stepped surface. The exhaust opening is on the rearward part whereas the duct is on the forward part. Gas leakage prevention grooves surround the grooved bottom. A triangular projection having dovetail sides extends from the grooved bottom and the engine propeller is positioned on the projection.

4 Claims, 11 Drawing Figures

BOTTOM EXHAUST HIGH SPEED BOAT

BACKGROUND OF THE INVENTION

1. Field of the Invention

This invention relates to a high speed boat having a bottom engine exhaust.

2. Description of the Prior Art

In the past, boats have discharged the engine exhaust gas into the atmosphere, and were required to install muffler devices, resulting in the disadvantages that the power output was reduced and the boat's weight was increased. Therefore, it has been proposed in Japanese Pat. No. 932,781 to discharge the exhaust gas to the boat's bottom, as shown in FIG. 1 and FIG. 2. In the bottom exhaust system, the main exhaust pipe b of the boat's engine a opens into the water at the boat's bottom c near to the stern of the boat. Further, an auxiliary exhaust pipe d is branched from the main exhaust pipe b to open to the atmosphere for the discharge of exhaust during stopping, slow forward travel and when moving backwards.

A groove e is formed in the boat's bottom along the longitudinal direction of the boat and extends forward from the ship's stern. The front wall f at the deepest part of the groove e and the ship's body g define a stepped portion h. The main exhaust pipe b is opened to the bottom c of the groove e at a portion near to the step h.

When this prior art device was applied to a boat of the 40 ton displacement class, the static pressure at the exhaust port in the boat's bottom was lower than the atmospheric pressure when the ship was moving at a speed of 5 to 4 knot or more, causing an increase in the suction of the engine, a corresponding increase in efficiency of the engine and a reduction in the fuel consumption.

SUMMARY OF THE INVENTION

This invention relates to a bottom exhaust type high speed boat which is improved over the above system, thereby allowing a reduction in the boat bottom's frictional resistance and, an increase in lift.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 3:
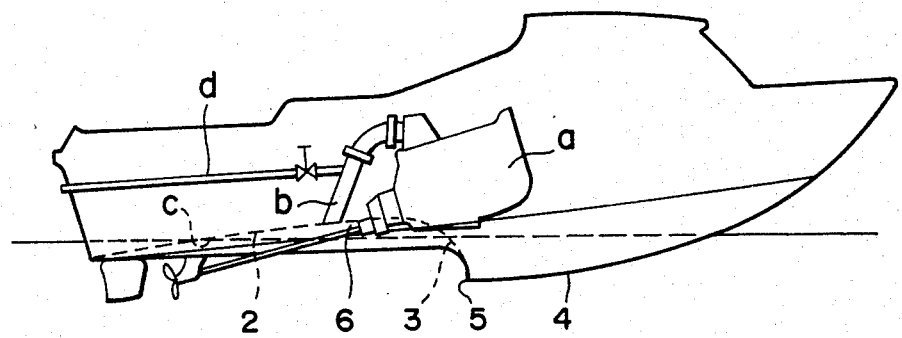
FIG. 3 shows a side view of the boat of the present invention.
Figure 4:
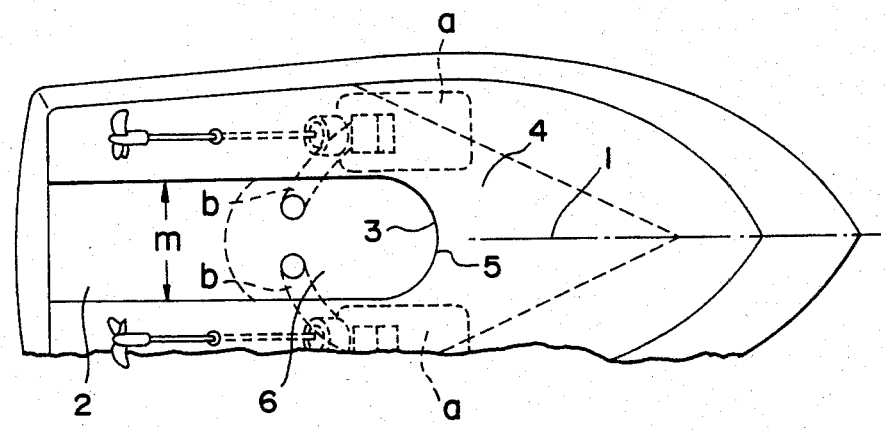
FIG. 4 shows a top view of the boat of the FIG. 3.

As shown in FIG. 3 and FIG. 4, the invention proposes a bottom exhaust boat having the main exhaust pipes b of the pair of engines a opening into the water from at the boat's bottom c near to the boat's stern. Auxiliary exhaust pipes d are branched from the exhaust pipes b to open to the atmosphere. Wall 3 is formed in the deepest part 6 of the grooved bottom 2. The grooved bottom has a width m centered along the keel line 1, and is defined by the wall 3 at the stepped part 5 separating the grooved bottom from between the remainder of the boat's bottom 4. Main exhaust pipes b are opened to the grooved bottom portion respectively. As a result, the deep part 6 in the grooved bottom 2 is filled with exhaust gas.

This arrangement not only decreases the frictional resistance by the lift generating at the portion of the boat's bottom 6 which is not contacting water, but also permits a relatively large boat width with an increase in the lifting surface. Therefore, one can reduce the wave making resistance, and the boat is suitable for high speed navigation.

Figure 5:
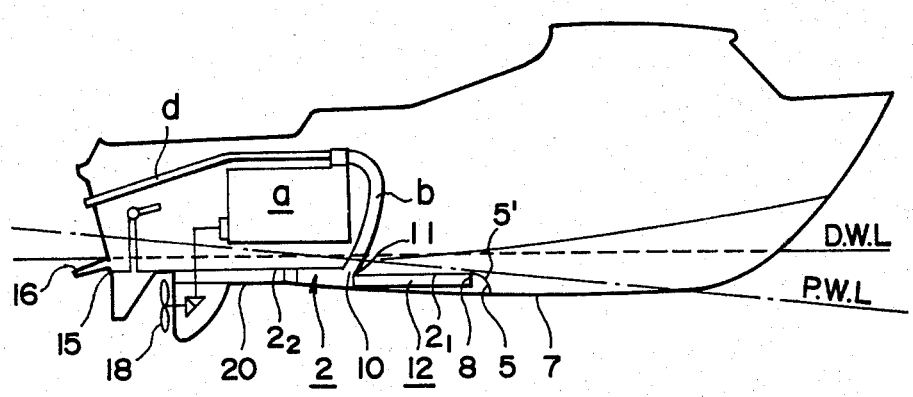
FIG. 5 shows a side view of a second embodiment.
Figure 6:
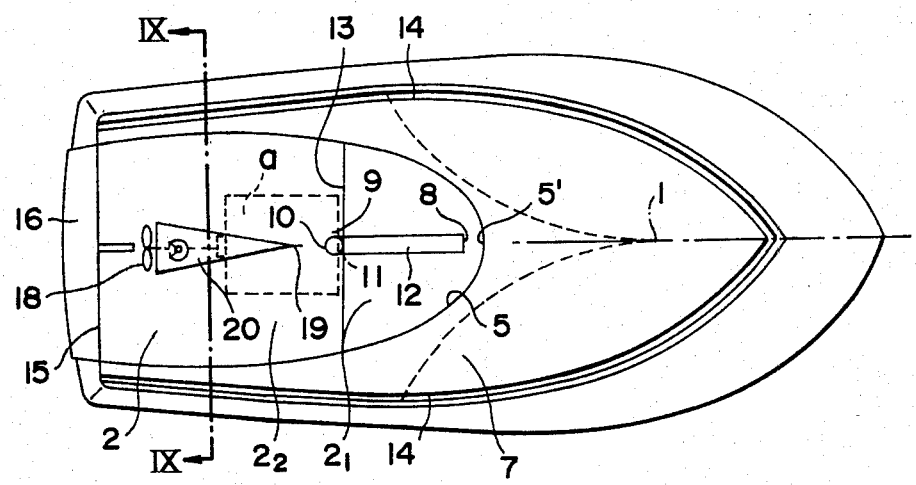
FIG. 6 shows a top view of the second embodiment.
Figure 7:
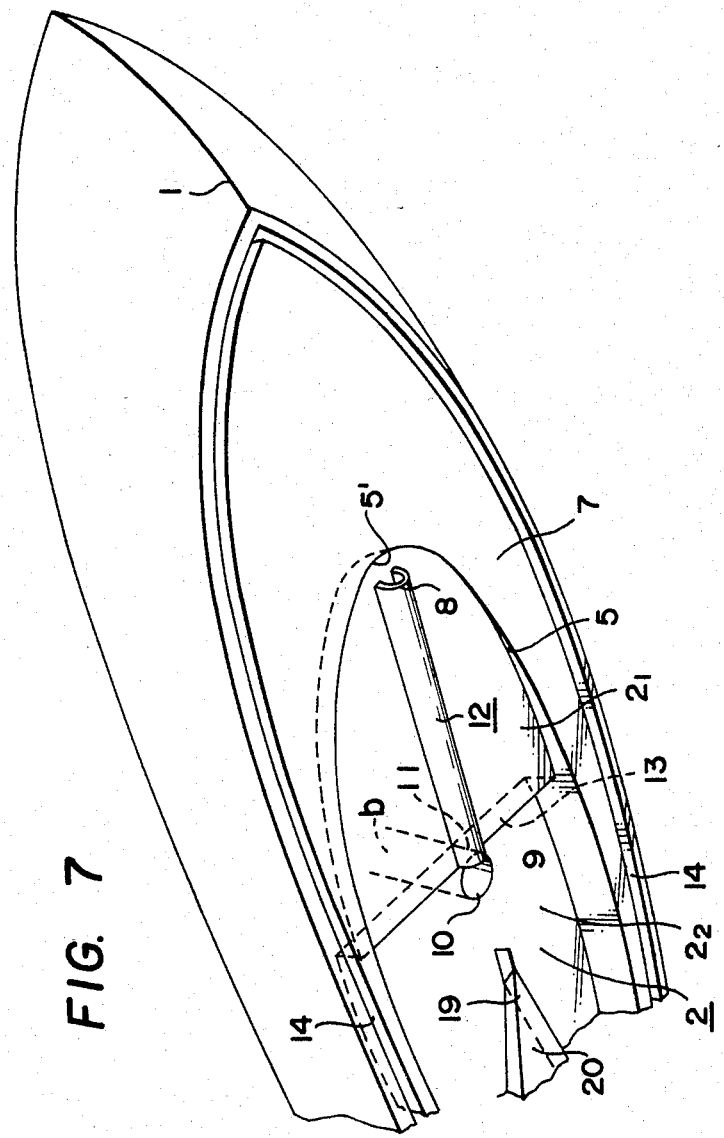
FIG. 7 shows a bottom view of the second embodiment.

However, when more speed is planned, the overall center of gravity of the boat is required to be moved to the rear by moving the main engine further to the rear than the position shown in FIG. 3 and FIG. 4. Therefore, a long main exhaust pipe is required in order that the main exhaust pipe opening will be positioned at the part 6 of the grooved bottom 2 as shown in FIG. 4. However, this arrangement has the disadvantages that the weight increases with the installation of the long main exhaust pipe within the hull, and that sophisticated construction is necessary to attach the high temperature exhaust pipe with the hull. Therefore, a second embodiment of FIGS. 5 through 7 is designed to open the main exhaust pipe b directly to the grooved bottom 2 adjacent the engine. Moreover, structure is provided for moving the exhaust gas up to the part 6 which is near to the step 5 of the grooved bottom 2.

Referring to FIGS. 5–7, the main exhaust pipe b of the engine a is made to open in the bottom of the boat near to the stern. The grooved bottom 2 extends on either side of the keel line 1. The stepped part 5 separates the grooved bottom 2 and the remainder of the boat bottom 7 so that the exhaust gas will fill the grooved bottom 2, as shown in FIG. 5 and FIG. 6. According to this embodiment, a duct 12, has one end 8 opened against the front part 5', which is nearest to the bow, of the stepped part 5 and the other end 9 opened to the edge 11, which is adjacent to, and nearer to the bow than, the opening 10 of the main exhaust pipe b.

Because of the above-mentioned construction of this embodiment, when negative pressure first arises at the part 5' of the stepped part 5 which is nearest to the bow, during the transition from low speed to high speed, the exhaust gas is sucked from the opening 10 of the main exhaust pipe b through the duct 12, and the grooved bottom part 2 is filled with exhaust gas in a short time, generating lift and reducing friction resistance.

Therefore, this embodiment allows one to increase the lift in a short time and to reduce frictional resistance, resulting in a high speed boat having better acceleration. Moreover, the boat's width can be made relatively large due to the increase of the lift, wave making resistance can be reduced, and a high speed boat also suitable as a pleasure boat, etc., can be obtained. Incidentally, during the backward movement of this high speed boat, the pressure rise at the exhaust pipe due to water flow is small because the opening 10 of the exhaust pipe b is spaced apart from the stepped part 5.

A further aspect of this embodiment relates to the opening 10 of the main exhaust pipe b in the grooved bottom part 2 behind the second stepped part 13 which extends in the direction of the width of the grooved bottom 2. The grooved bottom 2 is constituted by the first bottom $2_1$ and the second bottom $2_2$, and the duct 12 is placed on the first bottom $2_1$ while the opening 10 of the main exhaust pipe b is in the second bottom $2_2$.

Because of the above construction of the embodiment, the exhaust gas discharged from the opening 10 of the main exhaust pipe b is rapidly dispersed in the direction of the width of the grooved bottom 2, which rapidly reduces the water contacting area of the grooved bottom and prevents the water flow during accelerating from low speed. Accordingly, lift is increased in a short time during accelerating from low speed to high speed, and a bottom exhaust high speed boat having greater acceleration can be obtained.

Figures 10A, 10B:
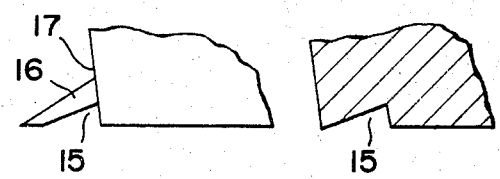

Yet another aspect of this embodiment relates to the exhaust gas leakage prevention groove 14 formed in the main part 7 of the bottom of the boat around the grooved bottom 2, and to the exhaust gas leakage prevention groove 15 formed in the stern. FIG. 10(a) shows a variant having the groove 15 formed directly in the bottom of the boat's stern and FIG. 10(b) shows the variant of forming the groove 15 by installing a flap 16 slightly above the transom 17.

According to the above embodiment, although the bottom is exposed to a sideways flowing exhaust gas, the exhaust gas leakage prevention groove 14 installed on the edges of the bottom serves to change the dynamic pressure of the gas into static pressure, yielding high pressures along the edges, which prevents the leakage of exhaust gas. Also, the groove 15 in the stern causes dynamic pressure to be converted to static pressure, forming a high pressure part at the stern so that leakage of the exhaust is prevented.

As a result, an air-cushion effect can be obtained by use of exhaust gas of the engine which is more economical in comparison with the air-cushion boat which uses power for driving a lift fan. The weight of the boat can also be reduced, and the boat can be operated with a lower horsepower engine for the same speed and same loading capacity, and the boat has good wave resistance in comparison with air-cushion boat. Moreover, the hull of the high speed boat is not equipped with skirt as is required in the case of air-cushion boat, resulting in the elimination of the expense and time for maintenance and repair of the skirt. The hull has resistance characteristics identical with that of the boat of the first embodiment at high speeds, however, it is possible to make the main engine smaller becuase there is not the steep increase of resistance under acceleration as in the case of the first embodiment.

Figure 1:
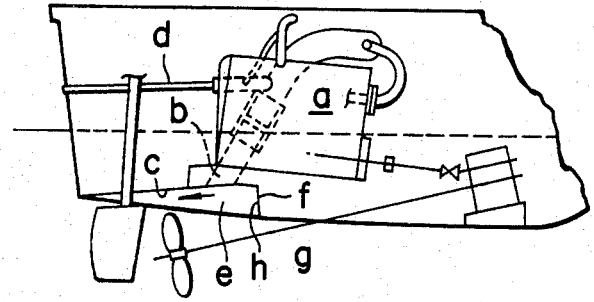
FIG. 1 shows an end view of a prior art boat, as seen along line I—I in FIG. 2.
Figure 8:
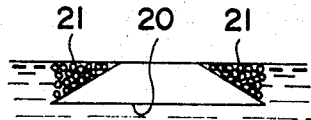
FIGS. 8-10 show details of the second embodiment.
Figure 2:
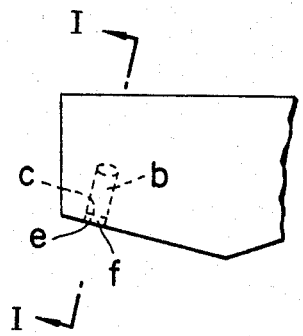
FIG. 2 shows a side view of a prior art boat.
Figure 9:
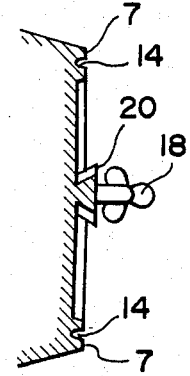

A fourth aspect of the invention involves installing the screw propeller 18 which is rotated by the engine to a position near the end of the grooved bottom 2. A projecting surface in the shape of an equilateral triangle 20 having vertex 29 pointed to the bow side, extends from the grooved bottom 2. The side surfaces of the projection form a dovetail as seen in FIG. 8 and FIG. 9. The propeller extends from surface 20.

When foaming water flowing by reason of the exhaust gas flows in the direction of the screw propeller 18, the projected surface 20 located in the path of the flow causes the water flow to be divided into two, and the foam 21 is forced into the deep portion of the dovetail groove as shown in the FIG. 8. Therefore the water flow including much of the foam will not flow into the propeller and reduce its efficiency.

In the past, when trying to obtain a high speed boat with grooved bottom for exhaust gas for with the purpose of increasing lift and reducing frictional resistance, it was thought necessary to use a two propeller driving system so as to prevent the flow of water with air bubbles to the propellers. However, a propelling system with other than two shafts has become practical by this invention.

Figure 11:
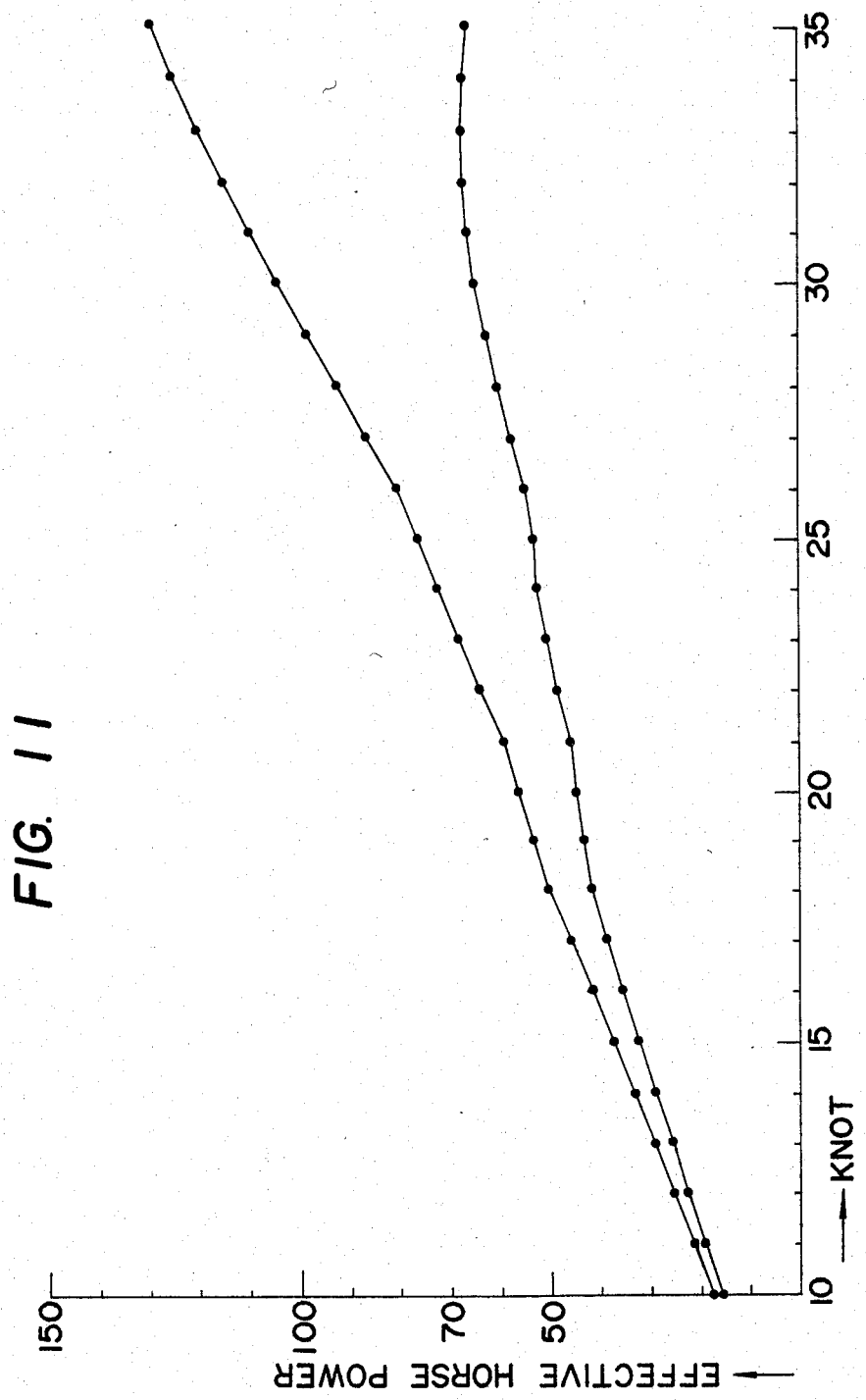
FIG. 11 shows a graph of the horsepower requirements of the present invention versus the prior art.

FIG. 11 is a chart of Effective Horsepower versus Speed of the bottom exhaust high speed boat. It is clear from the chart that a boat with a conventional bottom of the size of 30 tons displacement, 8 m long at water line and 2.5 m width at water line will require 130 HP to obtain the speed of 35 kt, whereas a boat having with this invention needs only 70 HP to develop the speed of 35 kt.

Further, the transportation efficiency of conventional cusion type passenger boat per horse power as calculated by the equation:

$$\text{Transport efficiency} = \frac{\text{People on Board} \times \text{Speed (Kt)}}{\text{HP}}$$

was about 1.5 to 2.0; however, the boat applied with this invention can develop 30.8 knots with a load of 30 people with the engine of 206 HP, so that transportation efficiency is very high at about 4.49.

Obviously, numerous modifications and variations of the present invention are possible in light of the above teachings. It is therefore to be understood that within the scope of the appended claims, the invention may be practiced otherwise than as specifically claimed.

What is claimed as new and is intended to be secured by Letters Patent is:

1. A bottom exhaust speed boat comprising:
    a hull having a bow, a keel and a bottom;
    an engine in said hull and having an exhaust pipe;
    a grooved portion recessed in said hull bottom and symmetric about said hull keel line, said grooved portion being separated from the remainder of said bottom by a first stepped surface, said exhaust pipe opening into said grooved portion, whereby said grooved portion becomes filled with exhaust gas; and
    a duct fixed to the surface of said hull and extending between said opening of said exhaust pipe and a portion of said grooved portion closest to said bow, said duct being open at both ends,
    whereby exhaust gas from said exhaust pipe is transported through said duct to said portion closest to said bow.

2. The boat of claim 1 including a second stepped surface extending transverse to said keel line, said second stepped surface separating said grooved portion into a forward part and a rearward part having a greater depth than said forward part, said exhaust pipe opening being positioned on said rearward part and said duct being positioned on said forward part.

3. The boat of claim 1 including:
    a first gas leakage prevention groove formed in said bottom around said grooved portion; and a second gas leakage prevention groove formed at the rear of said grooved portion.

4. The boat of claim 1 including a projection extending from a rear portion of said grooved portion, said projection having the shape of an equilateral triangle with a vertex pointing toward said bow, said projection having lateral projecting surfaces forming a dovetail, wherein a propeller driven by said engine extends from said projection.

* * * * *